Nov. 23, 1948.   F. F. EHRENHAFT   2,454,504
NONINTERMITTENT CINEMATOGRAPHIC PROJECTOR
Filed Jan. 29, 1946   4 Sheets-Sheet 4
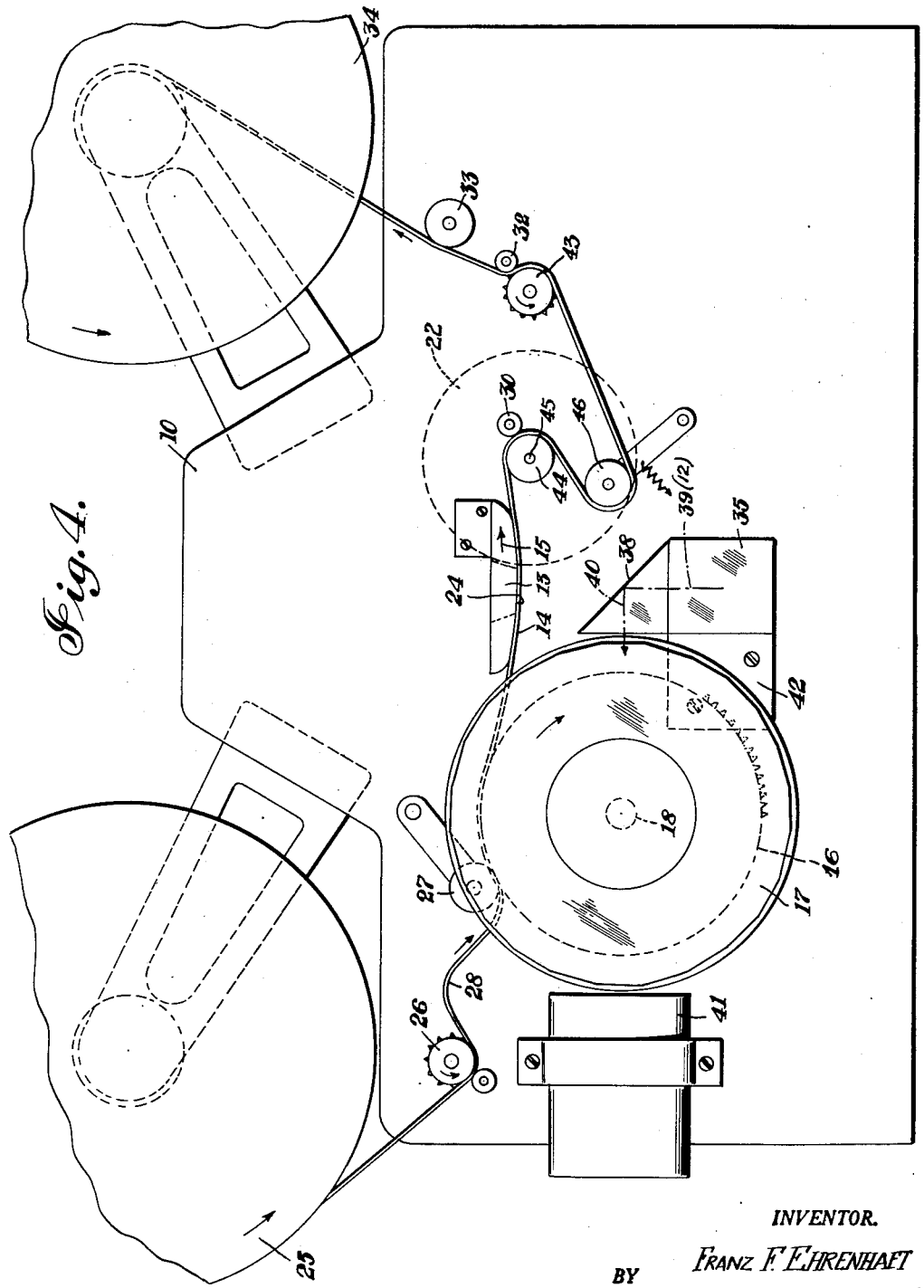
INVENTOR.
Franz F. Ehrenhaft
BY Patented Nov. 23, 1948

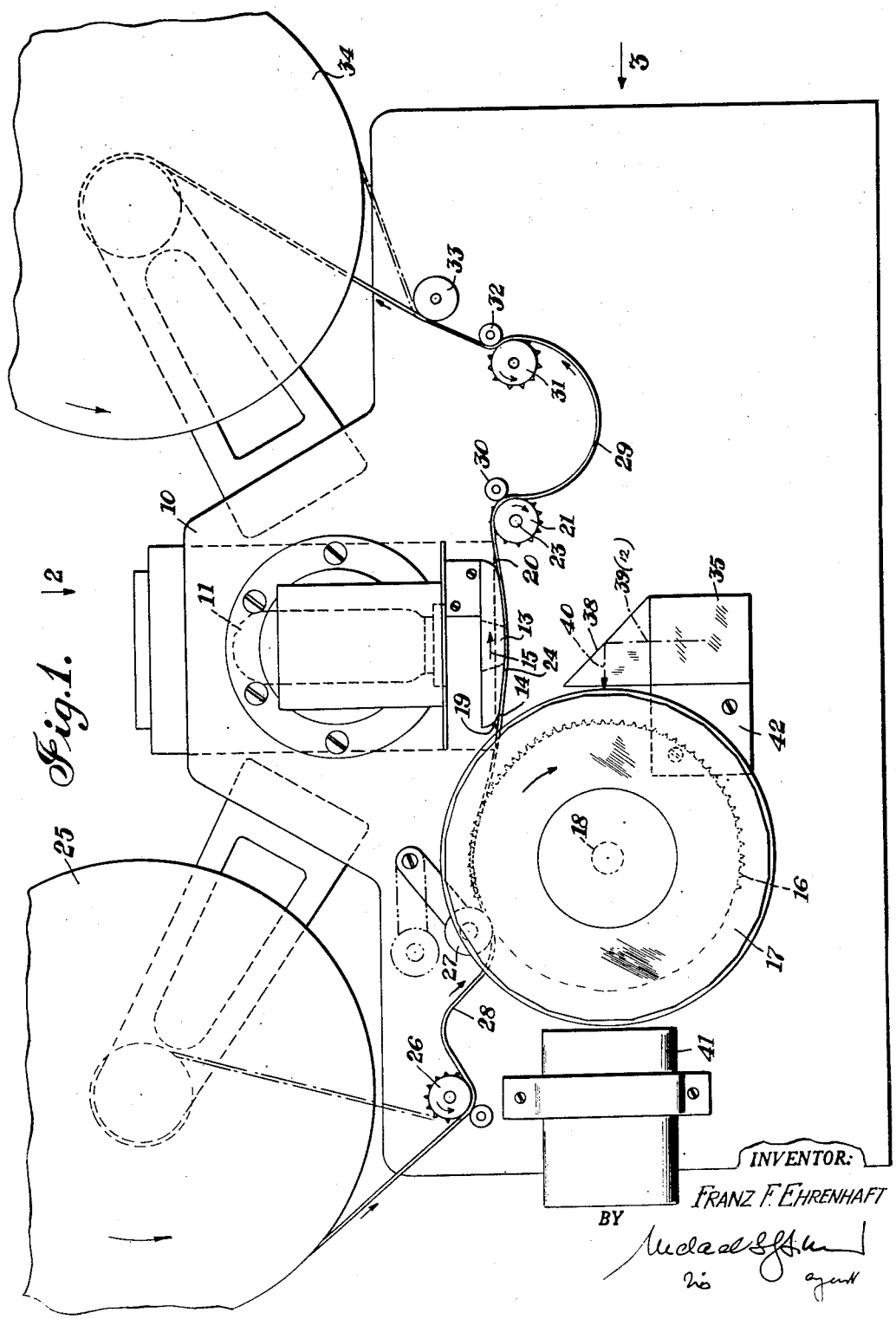

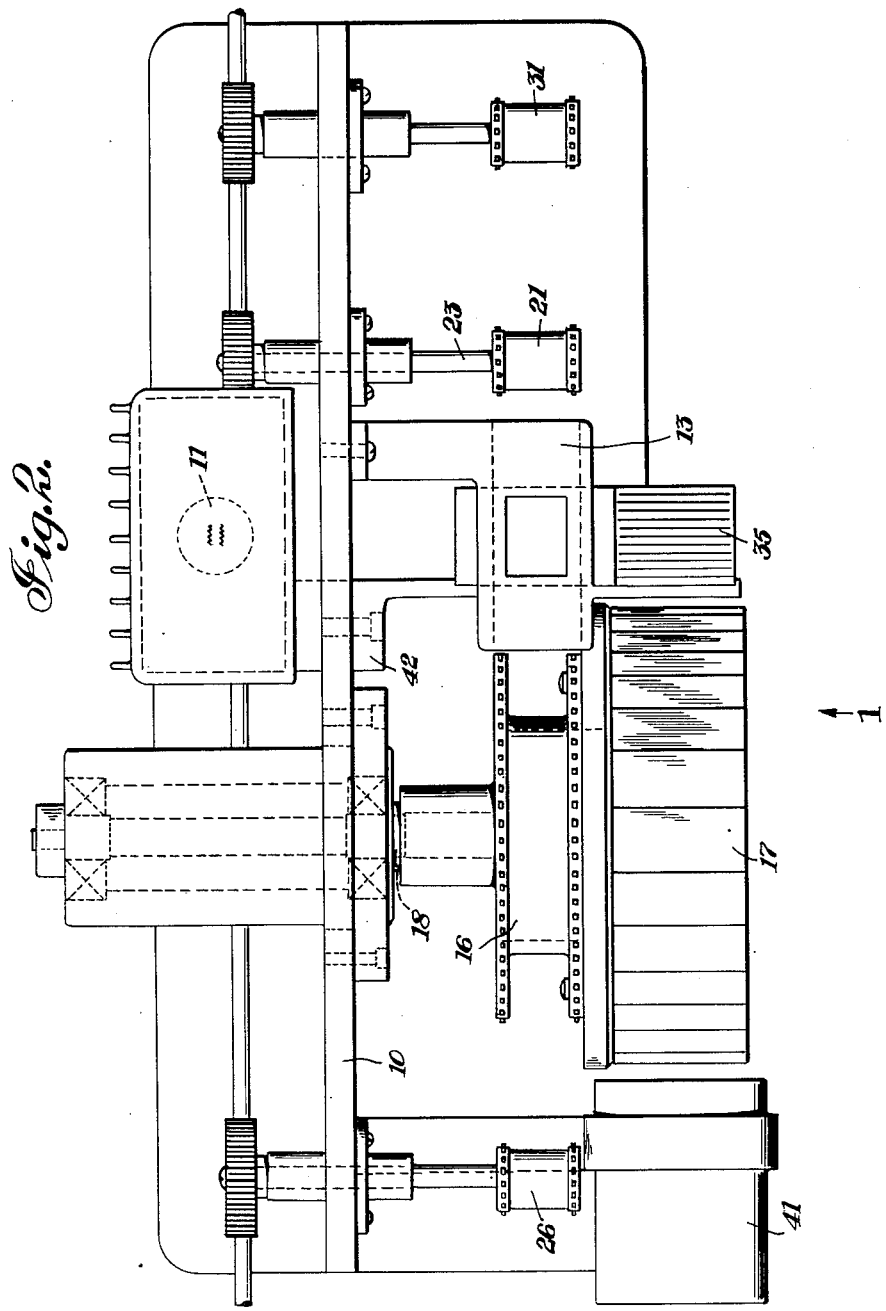

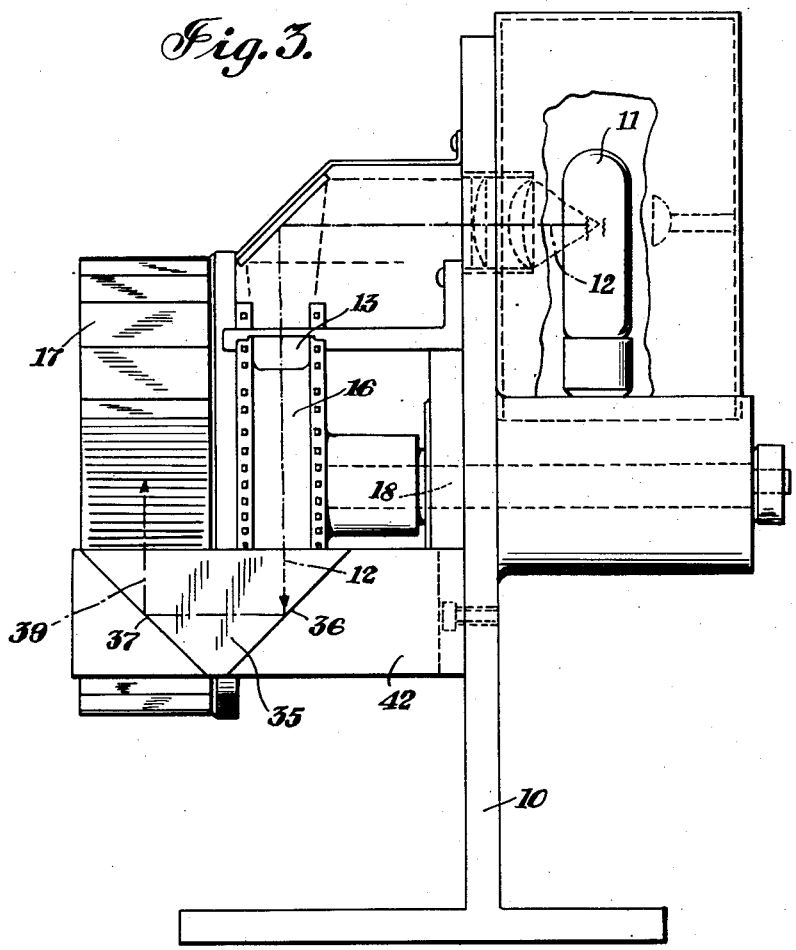

2,454,504

UNITED STATES PATENT OFFICE 2,454,504

NONINTERMITTENT CINEMATOGRAPHIC PROJECTOR

Franz F. Ehrenhaft, Forest Hills, N. Y.

Application January 29, 1946, Serial No. 644,105

11 Claims. (Cl. 88—16.8)

My present invention relates to continuous motion picture projectors and more particularly to motion picture projectors used for television purposes.

In projectors of the above type, it is of great importance to keep the speed of the film uniform and to synchronize the movement of the compensating member, e. g. rotation of the compensating prism, with the film movement. This means that during operation of the projector the speed of the moving film and the rotating prism have to be kept uniform and constant and in a certain predetermined relation to each other.

Any inaccuracy, particularly difference between the movement of the film and the compensating member, i. e. lack of synchronization, would result in unsteadiness of the images projected on the projection screen and make use of such projectors for television purposes impossible.

In television systems, particularly in systems comprising scanning devices without storage effect, it is advisable to use projectors in which polygonal refraction prisms are used are rectifying elements for compensation of the continuous film movement. Such prisms have to rotate with uniform speed and in perfect synchronism with the movement of the film. Even the elasticity of the film has such an effect upon proper synchronization that it is necessary to avoid formation of loops in the film strips during projection; otherwise, if no special precautions are taken, such loops would interfere with proper synchronization of the movement of the film through the film gate and the rotation of the refraction prism used as rectifier.

It is therefore an object of my present invention to provide a continuous motion picture projector constructed in such a manner as to obtain steady images on the projection screen.

It is another object of my present invention to avoid formation of loops between the film transporting means and the refraction prism used as rectifier.

More particularly, it is a further object of my present invention to construct non-intermittent motion picture projectors in which the compensating prism is rotated by the film itself in such a manner that the film moves with constant speed through the film gate and rotates during such movement the prism by engaging a sprocket secured to the same.

Still another object of my present invention consists in combining with film transporting and prism rotating means of the above type an optical reflecting system of specific type.

With the above objects in view, my new cinematographic projector includes as main elements in combination a light source emitting a projecting light beam, a film gate arranged in the path of this light beam and adapted to guide a film during projection, a sprocket arranged in the plane of movement of the film through this film gate in such a manner as to engage the film, a compensating prism arranged coaxially with this sprocket and rotated by the same, light reflecting means arranged in the path of the light beam after the same has passed through the film gate reflecting the beam through the compensating prism mentioned above, and film transporting means arranged in the path of the film after the same has passed through the film gate and constructed in such a manner as to be adapted to pull said film with constant speed through said film gate, said film thus uniformly rotating the sprocket mentioned above and the compensating prism combined with the same.

In this way it is possible to transport the film so as to obtain continuous uniform and non-intermittent movement of the same while passing through the film gate; it is also evident that by driving, i. e. rotating the sprocket mentioned above and the compensating prism combined with the same by this uniformly moving film it is possible to rotate the compensating prism also with constant speed.

I have found that the construction proposed herewith makes it possible to greatly reduce the distance between the three elements determining the steadiness of the projected pictures and the quality of the projection, namely of the sprocket rotating the compensating prism, the film gate and the film transporting sprocket, compared with known arrangements. For this purpose, I preferably arrange the sprocket rotating the prism at one end of the film gate immediately adjacent thereto and the transporting sprocket at the other end of the film gate immediately adjacent to that end.

I wish to stress that the construction proposed herewith has also the advantage that the uniformity of the movement of the film through the film gate is not affected by any irregularities caused by rotation of the combined sprocket-prism driving unit by the film.

I have also found that instead of arranging the film transporting sprocket immediately adjacent to the film gate I might provide it at a certain distance therefrom and arrange fly wheel means engaging the film between the sprocket and the film gate. Such fly wheel means have, of course, preferably to be arranged as near as possible to the film gate so as to keep the movement of the film while passing through the gate absolutely uniform.

Fly wheel means of the above type consist preferably of an idler roller engaging the film and driven by the same and a fly wheel concentrically secured to this roller.

I have found that best results can be obtained with a projector of the type proposed by me if the film gate is located at least substantially in the plane of the film passing from the prism driving sprocket to the film transporting sprocket. By an arrangement of this type, it is possible to avoid the provision of idler rollers which would only lengthen the path between the two sprockets mentioned above and thus cause non-uniform rotation of the compensating prism. Furthermore, by an arrangement of this type it is possible to substantially avoid friction of the film within the gate; such friction impairs the uniformity of the film movement and thus disadvantageously affects the uniformity of the prism rotation and the quality of the projected pictures.

I have found that particularly good results can be obtained by combining with film transporting and prism driving means of the above type light reflecting means of a specific type. These specific light reflecting means have to be constructed so that they reflect the light beam after it has passed through the film gate several times, namely so that it passes through the compensating prism not only normal to the axis of rotation of the shaft carrying this prism and the sprocket, but also normal to the path of the light beam passing through the film gate. Actually, it is necessary to reflect the light beam no less than three times; therefore I prefer to use for these purposes a so-called Porro prism of the second type. Such a prism may be regarded as a combination of three right angle prisms fused together in such a manner that the first two of these right angle prisms shift the axis of the light beam parallelly and the third of these right angle prisms erects the axis of the reflected light beam perpendicularly to the plane of shifting obtained by the first two prisms.

It is evident that the smaller the prism driving sprocket, the nearer it can be arranged to the film gate and the shorter will be the length of film between this gate and the first sprocket tooth engaging the film. Therefore, I have found it advisable to use in a projector of the type proposed herewith a prism driving sprocket of relatively small size. However, since the size of this sprocket determines the size of the prism driven by it, and the number of plane parallel faces of such a prism, reduction of the size of the sprocket will result in reduction of the size of the prism and of the number of plane parallel prism faces, i. e. it becomes necessary to use prisms having relatively few pairs of plane parallel faces. This, in turn, might in some cases result in flicker of the projected images. Since, as well known, in projectors of this type the flicker effect is the stronger the smaller the prism, i. e. the fewer faces the prism has.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a front view of a cinematographic projector according to my present invention, seen in direction of arrow 1 of Fig. 2;

Fig. 2 is a top view of the cinematographic projector shown in Fig. 1 without the film reels and the motion transmitting means driving the transporting sprockets, seen in direction of arrow 2 of Fig. 1;

Fig. 3 is a side view of the cinematographic projector shown in Figs. 1 and 2 without the film reels and the motion transmitting means driving the transporting sprockets, seen in direction of arrow 3 of Fig. 1; and Fig. 4 is a schematic front view of a cinematographic projector similar to the projector shown in Figs. 1 to 3, provided with fly wheel means.

The cinematographic projector shown in Figs. 1 to 3 comprises a supporting wall 10 on which all parts of the projector are mounted. The main parts of this projector are the light source 11 mounted on wall 10, as shown, and emitting a light beam 12 passing through the film gate 13 arranged in the path of this light beam. This film gate 13 serves for guiding the film 14 passing through the film gate in direction of arrow 15, as indicated in Fig. 1.

The prism rotating sprocket 16 is arranged in the plane of movement of the film 14, as clearly shown in the drawings, particularly in Fig. 2. The compensating prism 17 is arranged coaxially with the sprocket 16. Both sprocket 16 and prism 17 are carried by shaft 18 freely rotatably about a rotating axis arranged normal to the plane of movement of film 14. As shown in the drawings, sprocket 16 is arranged immediately adjacent and as near as possible to edge 19 of film gate 13.

Immediately adjacent and as near as possible to the other edge 20 of film gate 13 the film transporting sprocket 21 is arranged; this sprocket 21 is arranged on the shaft 23 and driven in well-known manner by means of an electric motor and motion transmitting means, not shown in the drawing.

As shown in the drawings, particularly Fig. 1 thereof, the film guiding face 24 of film gate 13 is arranged substantially in the plane of film 14 during passage of the same from the prism rotating sprocket 16 to the film transporting sprocket 21.

The above described parts form the main elements of my projector. Nevertheless, in order to fully describe the projector, it should be noted that the film is unwound from reel 25 by means of the driven sprocket 26, forms between this sprocket 26 and guiding roller 27 a film loop 28, is then guided by this guiding roller 27 into contact with the prism rotating sprocket 16, is then pulled by means of the film transporting sprocket 21 past the film guiding face 24 of film gate 13, forms again a loop 29 between the guiding roller 30 holding the film in contact with sprocket 21 and another driven sprocket 31, and is finally after passing past the guiding rollers 32 and 33 wound up on reel 34. This reel 34 is rotated in well-known manner by means of a pulley and belt arrangement combined with the driven sprocket 31.

For reflecting the light beam 12 through the compensating prism 17 after it has passed through film gate 13 and film 14 being in contact with the film guiding face 24 of the same, I employ a specific deflecting prism, namely a Porro prism of the second type designated in the drawing with numeral 35; a prism of this type has three reflecting faces 36, 37 and 38 directing the light beam 12 as indicated in the drawings in broken lines. The two reflecting faces 36 and 37 of this prism deflect the light beam 12 so that the reflected light beam 39 is parallel to light beam 12, but directed in opposite direction. This reflected light beam 39 is then erected by the reflecting face 38; thus, after these three reflections the light beam 40 is located in a plane normal to the axis of rotation of shaft 18 and is directed normal to the path of light beam 12. This light beam 40 then passes through the compensating prism 17 and projection lens 41, as shown in Fig. 1.

The Porro prism 35 described above is supported by bracket 42 secured to the wall 10.

I wish to note that in a projector of the type described above it is of great importance to arrange the teeth of the sprocket 16 in such a manner that in the position of the compensating prism 17 shown in Fig. 1 the center of an image on film 14 is in the center of the aperture within film gate 13, i. e. that in this position the central ray of the light beam 12 passes through the center of a film image.

Although not specifically claimed, I wish to stress that the length of the aperture within the film gate 13 in direction of movement of the film has to be so great that at least two images on the film are simultaneously illuminated, i. e. projected through this aperture. This is necessary in order to avoid flicker along the edges of the projected images. This minimum size of the aperture in the film gate is of certain importance for the arrangement proposed by me, since it influences the minimum distance between the film gate and the prism driving sprocket.

The modified projector schematically shown in Fig. 4 is very similar to the projector shown in Figs. 1 to 3. The only difference is that instead of arranging the transporting sprocket immediately adjacent to edge 20 of film gate 13, the transporting sprocket 43 is arranged at a certain distance from the film gate 13 and an idler roller 44 is mounted on wall 10 in such a manner as to engage the film 14 as near as possible to edge 20 of gate 13. This idler roller 44 is supported by shaft 45 which also carries a fly wheel 22. If the film is pulled by means of the transporting sprocket 43, the idler roller 44 will be rotated by the pulled film 14 and rotate the fly wheel 22 which, in turn, will keep the movement of this film 14 constant and uniform. A spring roller 46 keeping the film 14 between roller 44 and sprocket 43 under spring tension is arranged as shown in Fig. 4.

It will be understood that each of the elements described above, or two or more together, may also find a useful application in other types of cinematographic projectors differing from the types described above.

While I have illustrated and described the invention as embodied in projectors equipped with film driven compensating prisms, I do not intend to be limited to the details shown, since various modifications and structural changes may be made without departing in any way from the spirit of my invention.

Thus, for instance while I have described and shown as reflecting means a Porro prism, reflecting means of other types might be used, too.

What I claim as new and desire to secure by Letters Patent is:

1. In a cinematographic projector, in combination a light source emitting a projecting light beam; a film gate arranged in the path of said light beam and adapted to guide a film during movement of said film through said film gate so that said light beam emitted by said light source is impinging on one side of said film; a sprocket arranged in the plane of said movement of said film through said film gate immediately adjacent to one end of the same in such a manner as to engage the other side of said film before passing through said film gate; a compensating prism arranged co-axially with said sprocket having a diameter being larger than the diameter of said sprocket; means carrying both said sprocket and said compensating prism rotatably about a common axis which is normal to said plane of movement of said film through said film gate; light reflecting means arranged in said path of said light beam after the same has passed through said film gate reflecting said light beam through said compensating prism; film transporting means arranged in the path of said film after the same has passed through said film gate; and fly wheel means arranged immediately adjacent to the other end of said film gate between the same and said film transporting means and constructed in such a manner as to engage said film immediately after the same has passed through said film gate and to be rotated by the same.

2. In a cinematographic projector, in combination a light source emitting a projecting light beam; a film gate arranged in the path of said light beam and adapted to guide a film during movement of said film through said film gate so that said light beam emitted by said light source is impinging on one side of said film; a sprocket arranged in the plane of said movement of said film through said film gate immediately adjacent to one end of the same in such a manner as to engage the other side of said film before passing through said film gate; a compensating prism arranged co-axially with said sprocket having a diameter being larger than the diameter of said sprocket; means carrying both said sprocket and said compensating prism rotatably about a common axis which is normal to said plane of movement of said film through said film gate; light reflecting means arranged in said path of said light beam after the same has passed through said film gate reflecting said light beam through said compensating prism; a film transporting sprocket arranged in the path of said film after the same has passed through said film gate; and fly wheel means arranged immediately adjacent to the other end of said film gate between the same and said film transporting sprocket and construucted in such a manner as to engage said film immediately after the same has passed through said film gate and to be rotated by the same.

3. In a cinematographic projector, in combination a light source emitting a projecting light beam; a film gate arranged in the path of said light beam and adapted to guide a film during movement of said film through said film gate so that said light beam emitted by said light source is impinging on one side of said film; a first sprocket arranged in the plane of said movement of said film through said film gate immediately adjacent to one end of the same in such a manner as to engage the other side of said film before passing through said film gate; a compensating prism arranged co-axially with said first sprocket having a diameter being larger than the diameter of said sprocket; means carrying both said first sprocket and said compensating prism rotatably about a common axis which is normal to said plane of movement of said film through said film gate; light reflecting means arranged in said path of said light beam after the same has passed through said film gate reflecting said light beam through said compensating prism; film transporting means arranged in the path of said film after the same has passed through said film gate; a second sprocket arranged immediately adjacent to the other end of said film gate between the same and said film transporting means and constructed in such a manner as to engage said film immediately after the same has passed through said film gate and to be rotated by the same; and fly wheel means arranged and constructed in such a manner as to be rotated by said second sprocket during rotation of the latter.

4. In a cinematographic projector, in combination a light source emitting a projecting light beam; a film gate arranged in the path of said light beam and adapted to guide a film during movement of said film through said film gate so that said light beam emitted by said light source is impinging on one side of said film; a sprocket arranged in the plane of said movement of said film through said film gate immediately adjacent to one end of the same in such a manner as to engage the other side of said film before passing through said film gate; a compensating prism arranged co-axially with said sprocket having a diameter being larger than the diameter of said sprocket; means carrying both said sprocket and said compensating prism rotatably about a common axis which is normal to said plane of movement of said film through said film gate; light reflecting means arranged in said path of said light beam after the same has passed through said film gate reflecting said light beam through said compensating prism; a film transporting sprocket arranged in the path of said film after the same has passed through said film gate; a second sprocket arranged immediately adjacent to the other end of said film gate between the same and said film transporting sprocket and constructed in such a manner as to engage said film immediately after the same has passed through said film gate and to be rotated by the same; and fly wheel means arranged and constructed in such a manner as to be rotated by said second sprocket during rotation of the latter.

5. In a cinematographic projector, in combination a light source emitting a projecting light beam; a film gate arranged in the path of said light beam and adapted to guide a film during movement of said film through said film gate so that said light beam emitted by said light source is impinging on one side of said film; a sprocket arranged in the plane of said movement of said film through said film gate immediately adjacent to one end of the same in such a manner as to engage the other side of said film before passing through said film gate; a compensating prism arranged co-axially with said sprocket having a diameter being larger than the diameter of said sprocket; means carrying both said sprocket and said compensating prism rotatably about a common axis which is normal to said plane of movement of said film through said film gate; light reflecting means arranged in said path of said light beam after the same has passed through said film gate reflecting said light beam through said compensating prism; and a film transporting sprocket arranged immediately adjacent to the other end of said film gate in the path of said film after the same has passed through said film gate and constructed in such a manner as to be adapted to pull said film with constant speed through said film gate, said film thus rotating said sprocket and said compensating prism combined with the same; said film transporting sprocket and said sprocket rotating said compensating prism being arranged in such a manner that said film gate is located at least substantially in the plane of the film passing from said sprocket rotating said compensating prism to said film transporting sprocket.

6. In a cinematographic projector, in combination a light source emitting a projecting light beam; a film gate arranged in the path of said light beam and adapted to guide a film during movement of said film through said film gate so that said light beam emitted by said light source is impinging on one side of said film; a sprocket arranged in the plane of said movement of said film through said film gate in such a manner as to engage the other side of said film before passing through said film gate; a compensating prism arranged co-axially with said sprocket having a diameter being larger than the diameter of said sprocket; shaft means carrying both said sprocket and said compensating prism rotatably about a common axis which is normal to said plane of movement of said film through said film gate; first light reflecting means arranged in said path of said light beam after the same has passed through said film gate reflecting said light beam so that the reflected light beam is parallel to the path of said light beam passing through said film gate but directed in opposite direction; second light reflecting means arranged in the path of said reflected light beam reflecting the same through said compensating prism; and film transporting means arranged in the path of said film after the same has passed through said film gate and constructed in such a manner as to be adapted to pull said film with constant speed through said film gate, said film thus rotating said sprocket and said compensating prism combined with the same.

7. In a cinematographic projector, in combination a light source emitting a projecting light beam; a film gate arranged in the path of said light beam and adapted to guide a film during movement of said film through said film gate so that said light beam emitted by said light source is impinging on one side of said film; a sprocket arranged in the plane of said movement of said film through said film gate immediately adjacent to one end of the same in such a manner as to engage the other side of said film before passing through said film gate; a compensating prism arranged co-axially with said sprocket having a diameter being larger than the diameter of said sprocket; shaft means carrying both said sprocket and said compensating prism rotatably about a common axis which is normal to said plane of movement of said film through said film gate; first light reflecting means arranged in said path of said light beam after the same has passed through said film gate reflecting said light beam so that the reflected light beam is parallel to the path of said light beam passing through said film gate but directed in opposite direction; second light reflecting means arranged in the path of said reflected light beam reflecting the same through said compensating prism; and a film transporting sprocket arranged immediately adjacent to the other end of said film gate in the path of said film after the same has passed through said film gate and constructed in such a manner as to be adapted to pull said film with constant speed through said film gate, said film thus rotating said sprocket and said compensating prism combined with the same.

8. In a cinematographic projector, in combination a light source emitting a projecting light beam; a film gate arranged in the path of said light beam and adapted to guide a film during movement of said film through said film gate so that said light beam emitted by said light source is impinging on one side of said film; a sprocket arranged in the plane of said movement of said film through said film gate immediately adjacent to one end of the same in such a manner as to engage the other side of said film before passing through said film gate; a compensating prism arranged co-axially with said sprocket having a diameter being larger than the diameter of said sprocket; shaft means carrying both said sprocket and said compensating prism rotatably about a common axis which is normal to said plane of movement of said film through said film gate; first light reflecting means arranged in said path of said light beam after the same has passed through said film gate reflecting said light beam so that the reflected light beam is parallel to the path of said light beam passing through said film gate but directed in opposite direction; second light reflecting means arranged in the path of said reflected light beam reflecting the same through said compensating prism; film transporting means arranged in the path of said film after the same has passed through said film gate; and fly wheel means arranged immediately adjacent to the other end of said film gate between the same and said film transporting sprocket and constructed in such a manner as to engage said film immediately after the same has passed through said film gate and to be rotated by the same.

9. In a cinematographic projector, in combination a light source emitting a projecting light beam; a film gate arranged in the path of said light beam and adapted to guide a film during movement of said film through said film gate so that said light beam emitted by said light source is impinging on one side of said film; a sprocket arranged in the plane of said movement of said film through said film gate immediately adjacent to one end of the same in such a manner as to engage the other side of said film before passing through said film gate; a compensating prism arranged co-axially with said sprocket having a diameter being larger than the diameter of said sprocket; shaft means carrying both said sprocket and said compensating prism rotatably about a common axis which is normal to said plane of movement of said film through said film gate; first light reflecting means arranged in said path of said light beam after the same has passed through said film gate reflecting said light beam so that the reflected light beam is parallel to the path of said light beam passing through said film gate but directed in opposite direction; second light reflecting means arranged in the path of said reflected light beam reflecting the same through said compensating prism; and a film transporting sprocket arranged immediately adjacent to the other end of said film gate in the path of said film after the same has passed through said film gate and constructed in such a manner as to be adapted to pull said film with constant speed through said film gate, said film thus rotating said sprocket and said compensating prism combined with the same; said film transporting sprocket and said sprocket rotating said compensating prism being arranged in such a manner that said film gate is located at least substantially in the plane of the film passing from said sprocket rotating said compensating prism to said film transporting sprocket.

10. In a cinematographic projector, in combination a light source emitting a projecting light beam; a film gate arranged in the path of said light beam and adapted to guide a film during movement of said film through said film gate so that said light beam emitted by said light source is impinging on one side of said film; a sprocket arranged in the plane of said movement of said film through said film gate in such a manner as to engage the other side of said film before passing through said film gate; a compensating prism arranged co-axially with said sprocket having a diameter being larger than the diameter of said sprocket; means carrying both said sprocket and said compensating prism rotatably about a common axis which is normal to said plane of movement of said film through said film gate; a Porro prism of the second type arranged in said path of said light beam after the same has passed through said film gate reflecting said light beam through said compensating prism; and a film transporting sprocket arranged immediately adjacent to said film gate in the path of said film after the same has passed through said film gate and constructed in such a manner as to be adapted to pull said film with constant speed through said film gate, said film thus rotating said sprocket and said compensating prism combined with the same.

11. In a cinematographic projector, in combination a light source emitting a projecting light beam; a film gate arranged in the path of said light beam and adapted to guide a film during movement of said film through said film gate so that said light beam emitted by said light source is impinging on one side of said film; a sprocket arranged in the plane of said movement of said film through said film gate in such a manner as to engage the other side of said film before passing through said film gate; a compensating prism arranged co-axially with said sprocket having a diameter being larger than the diameter of said sprocket; shaft means carrying both said sprocket and said compensating prism rotatably about a common axis which is normal to said plane of movement of said film through said film gate; a Porro prism of the second type arranged in said path of said light beam after the same has passed through said film gate reflecting said light beam through said compensating prism; and a film transporting sprocket arranged immediately adjacent to the other end of said film gate in the path of said film after the same has passed through said film gate and constructed in such a manner as to be adapted to pull said film with constant speed through said film gate, said film thus rotating said sprocket and said compensating prism combined with the same; said film transporting sprocket and said sprocket rotating said compensating prism being arranged in such a manner that said film gate is located at least substantially in the plane of the film passing from said sprocket rotating said compensating prism to said film transporting sprocket.

FRANZ F. EHRENHAFT.

REFERENCES CITED

The following references are of record in the file of this patent:

UNITED STATES PATENTS

| Number | Name | Date |
|---|---|---|
| 2,003,381 | May | June 4, 1935 |
| 2,042,027 | Simons | May 26, 1936 |
| 2,247,295 | Heinisch | June 24, 1941 |
| 2,322,369 | Lackoff et al. | June 22, 1943 |
| 2,325,131 | Harrison | July 27, 1943 |

FOREIGN PATENTS

| Number | Country | Date |
|---|---|---|
| 289,635 | Italy | Oct. 22, 1931 |
| 527,956 | Great Britain | Oct. 18, 1940 |